Figure 2:
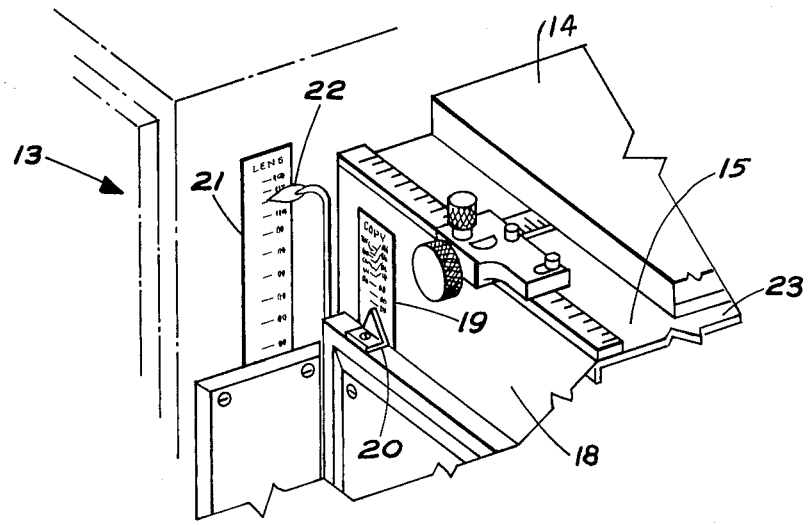

March 1, 1966   W. V. SHEARER ETAL   3,237,516
OPTICAL APPARATUS FOR USE IN THE REPRODUCTION OF IMAGES
Original Filed April 24, 1962   4 Sheets-Sheet 1

INVENTORS
WILLIAM V. SHEARER
WILLIAM R. BECK, JR.
BY ARNOLD M. WHEELOCK, SR.

Cleveland B. Hillabaugh
ATTORNEY

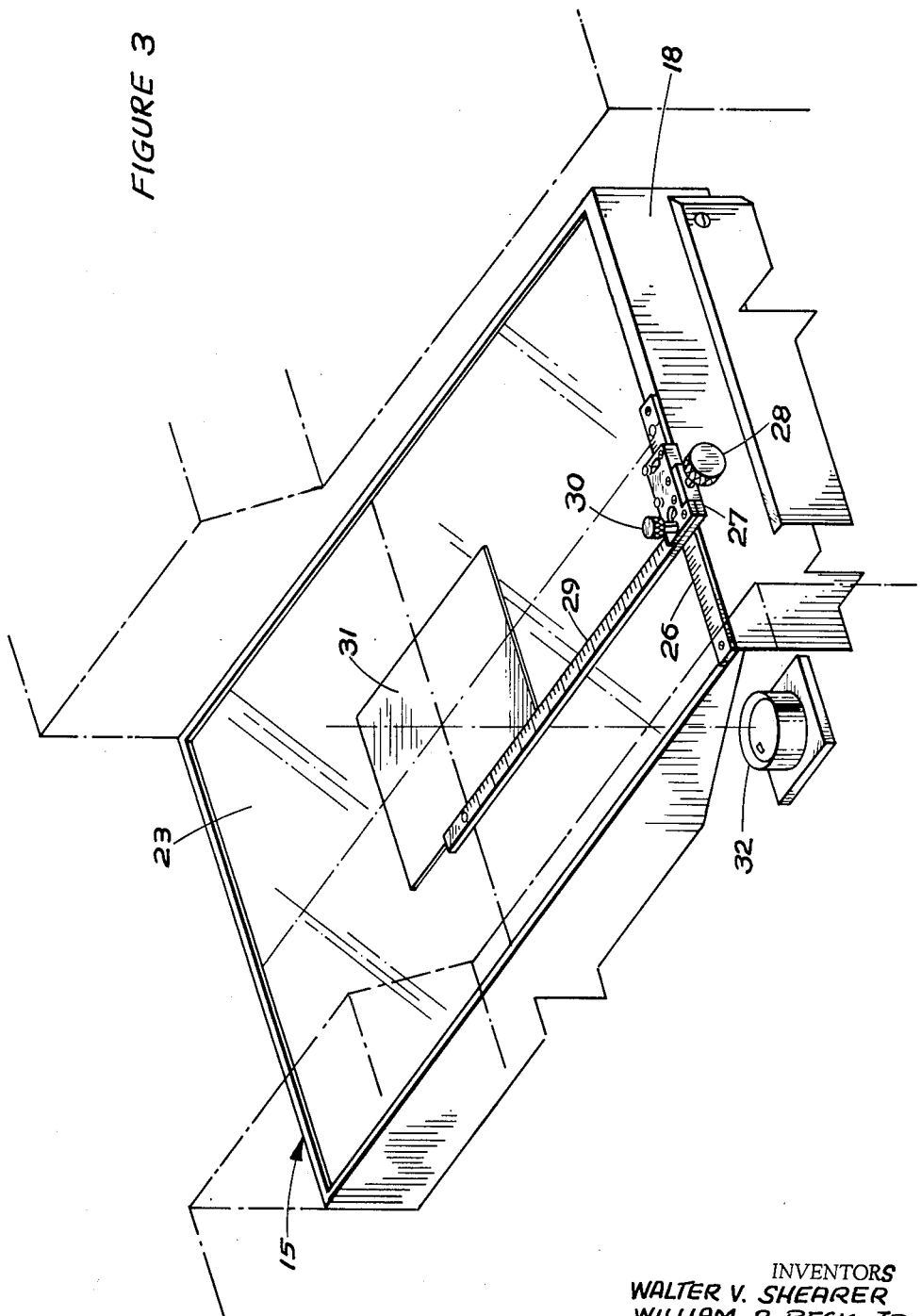

United States Patent Office 3,237,516
Patented Mar. 1, 1966

3,237,516
OPTICAL APPARATUS FOR USE IN THE
REPRODUCTION OF IMAGES
Walter V. Shearer, Longmeadow, William R. Beck, Jr., Wilbraham, and Arnold M. Wheelock, Sr., Southwick, Mass., assignors to The Plastic Coating Corporation
Original application Apr. 24, 1962, Ser. No. 189,758, now Patent No. 3,180,239, dated Apr. 27, 1965. Divided and this application Dec. 23, 1964, Ser. No. 420,762
10 Claims. (Cl. 88—24)

This application is a division of our application Serial No. 189,758, filed April 24, 1962, now U.S. Patent No. 3,180,239, which describes and claims a complete, self-contained reprographer which reproduces original copy by a photoelectrostatic reproduction process and which includes the apparatus of this invention as an essential component. The apparatus in accordance with this invention was developed for use as a component of the photoelectrostatic reprographer described by the said application Serial No. 189,758, now U.S. Patent No. 3,180,-239, and has proved to be well adapted for that purpose.

This invention relates to optical apparatus for use in the reproduction of images and more particularly to optical apparatus which transmits an optical image from original copy held in a horizontal plane to a vertical plane in which the image is recorded on a light-sensitive surface.

This optical apparatus is equally useful in equipment which reproduces original copy by methods other than photoelectrostatic reproduction, including silver halide photography, diazo and blue-print reproduction and reproduction by the use of casein or albumin-dichromate coatings.

It is an object of this invention to provide optical apparatus for the reproduction of original copy which is compact and which includes a horizontal, copy-receiving surface located at a convenient height for the reception and removal of original copy by an operator standing adjacent the apparatus.

A further object is to provide optical apparatus for the reproduction of original copy placed face downwardly on its transparent, copy-receiving surface which transmits to a vertical plane, an image which is the same size as the original copy or of a reduced size or of an enlarged size.

Another object of this invention is to provide optical apparatus for the reproduction of original copy which provides for the adjustment of the ratio between the size of the image transmitted for reproduction and that of the original copy by means located in positions convenient to an operator standing in a location for placing original copy in position for reproduction and includes conveniently located indices by which the operator is informed of the precise adjustment of the apparatus.

Another object is to provide optical apparatus which is precise and free of vibration even when used in conjunction with other apparatus which is subjected to vibration arising from the mechanical motion of parts thereof.

Another object is to provide optical apparatus for the reproduction of original copy which provides for the precise positioning of the original copy with respect to its transmitted image and a precise adjustment of the ratio of the size of the transmitted optical image to the size of the original copy, thereby rendering the apparatus well suited for use in the production of offset masters on which the copy is precisely positioned and which require no adjustment on a duplicating machine.

Another object is to provide optical apparatus for the reproduction of original copy which transmits an image of the original copy to a plane with relative light intensities which are substantially uniform over the entire area of the transmitted image.

Another object is to provide optical apparatus sources for the nonuniform illumination of original copy in a horizontal plane and an electrical control system for the said apparatus which automatically provides a timed transmission of an optical image from the said horizontal plane to a vertical plane which is of uniform intensity during the timed period of transmission.

Other objects of this invention and its various advantageous features will become apparent from the detailed description which follows.

The optical apparatus in accordance with this invention comprises in combination a means for retaining an original to be copied in a horizontal plane; a lens system located beneath the said horizontal plane which has a vertically positioned optical axis and includes a lens, a diaphragm and a shutter; a mirror located below the said lens system with its reflecting surface at an angle of forty-five degrees to the optical axis of the lens system in a position to reflect an optical image transmitted by the said lens to a vertical optical image plane; and light sources adjacent the horizontal plane in which the said copy-retaining means holds an original copy, the said light sources being located to produce an optical image of the original copy which is transmitted by the lens to the mirror which reflects it to the vertical optical image plane, the said lens being located between the horizontal plane of the original copy in a position with respect to its optical characteristics to permit it to transmit a clear optical image of the said original copy in the said horizontal plane to the said mirror.

This apparatus includes a transparent copyboard on which original copy is placed face downwardly. Beneath this copyboard is the mirror positioned at an angle of forty-five degrees to a horizontal plane. The lens system is interposed between the copyboard and the mirror with its optical axis positioned vertically and has a focal length and other optical characteristics which enable it to transmit a clear image of copy on the transparent copyboard to the mirror which, in turn reflects this image to a vertical plane. The shutter associated with the lens system is electrically operated and is controlled by electrical equipment which also controls and synchronizes the operation of the light sources which illuminate copy on the transparent copyboard of the apparatus with the operation of the shutter.

A plurality of light sources are located at a level below the plane in which the copyboard is situated and outside the optical path between the copyboard and the lens system. These light sources are in locations which illuminate the entire area of the copyboard in a nonuniform manner to provide progressively more intense illumination from the center of the copyboard to its outer edges and corners. This illumination is adjusted so that the reflected light from a white surface covering the entire area of the copyboard transmitted by the optical system provides uniform illumination over the entire area of the optical image plane of the apparatus. These lights are illuminated by an electrical current of relatively low voltage at all times during the operation of the apparatus and are automatically brought to full voltage and full illumination by the electrical control system of the apparatus after a light-sensitive sheet has been placed in the optical image plane of the system.

The light sources of this optical system include at least two banks of lights, each of which can be readily removed as a unit for the replacement of a bulb and replaced in the unit in its exact original position. Two additional banks of lights may be included in the system to secure the desirable nonuniform illumination. This feature avoids the necessity to readjust the light sources each time one of its bulbs burns out.

The electrical system which is utilized to control this apparatus is adapted to form an integral part of an electrical control system of an apparatus for the reproduction of original copy. It includes an electric timer which can be set by the operator of the apparatus and a variable voltage power supply. The variable voltage power supply is electrically connected to the lamps which illuminate the horizontal copyboard of the apparatus and is adapted to supply electric current to the lamps at a relatively low voltage to keep them glowing and, upon activation by the timer of the apparatus, to increase that voltage to a preset, higher level which brings the lamps to a desired level of illumination.

The electric timer of this apparatus which controls the level of illumination provided by the lamps of the apparatus also operates the shutter of the optical system which may be, for example, operated by a solenoid. This electric timer, upon receiving a pulse from another segment of the electrical control system of the reproduction apparatus, simultaneously causes the solenoid which operates the shutter to open the shutter and to activate the power supply to the lamps to increase the voltage of the current which they are receiving to a preset, higher level which brings the lamps to the desired level of illumination. After the lapse of the period of time set by the operator of the apparatus, the timer simultaneously causes the variable voltage power supply of the apparatus to reduce the voltage supplied to the lamps to its original low level and causes the solenoid to close the shutter.

This electrical system operates the shutter of the lens in exact synchronism with its operation of the lights. The shutter is opened after the lights have an opportunity to come to full illumination after the application of their full voltage and closed before the full voltage is stepped back to the lower level.

Both the copyboard and the lens system of this apparatus are desirably, but not necessarily, adjustable along a vertical axis to permit changes in the ratio of the size of the image transmitted to the vertical image plane of the apparatus with respect to the size of the original copy. The adjustability of the copyboard and the lens system may be such that the photoelectrostatic copy may be made the same size or larger, the same size or smaller or the same size of either larger or smaller than the original copy. When this feature is included in the apparatus, the light sources which illuminate the copyboard are attached to the copyboard in a fixed relationship thereto, so that they move with the copyboard when its position is changed.

This optical system is designed in such a manner that an image of an original on the copyboard can be accurately focused in the optical image plane and accurately positioned within that horizontal plane, so that it is accurately located with respect to the edge of a photoelectrostatic sheet brought into the image plane by the vacuum platen of the apparatus. This optical system is desirably designed to illuminate areas around the projected optical image of the original copy which are broad enough to fully illuminate the marginal, nonimage areas of the photoelectrostatic sheet being exposed to fully discharge a residual electrostatic charge carried by the marginal areas.

This optical system has several advantageous features. The copyboard is designed to permit the operator of the apparatus to rapidly and accurately position the original copy on the copyboard with respect to the margins of the reproduced copy. Further, the optical system is precise and free of vibration even when the apparatus is carrying out its automatic operations with the required mechanical movements in other parts of the apparatus. These features adapt the apparatus for the production of crisp copy which has an accurately registered image area. For these reasons, the apparatus is particularly well adapted for the production of offset masters to be formed into lithographic printing plates, since the printing plates require essentially no adjustment on an offset lithographic press or an offset duplicating machine to produce accurately centered copy.

The apparatus in accordance with this invention has been generally described and some of its advantageous features pointed out in the foregoing. Specific embodiments of this apparatus will now be described with reference to the accompanying drawings in which like reference characters are used to refer to like parts wherever they may occur. The incorporation of this apparatus as an integral part of a complete, self-contained reprographer which reproduces copy by a photoelectrostatic reproduction process will also be illustrated and described in the drawings.

Figure 1:
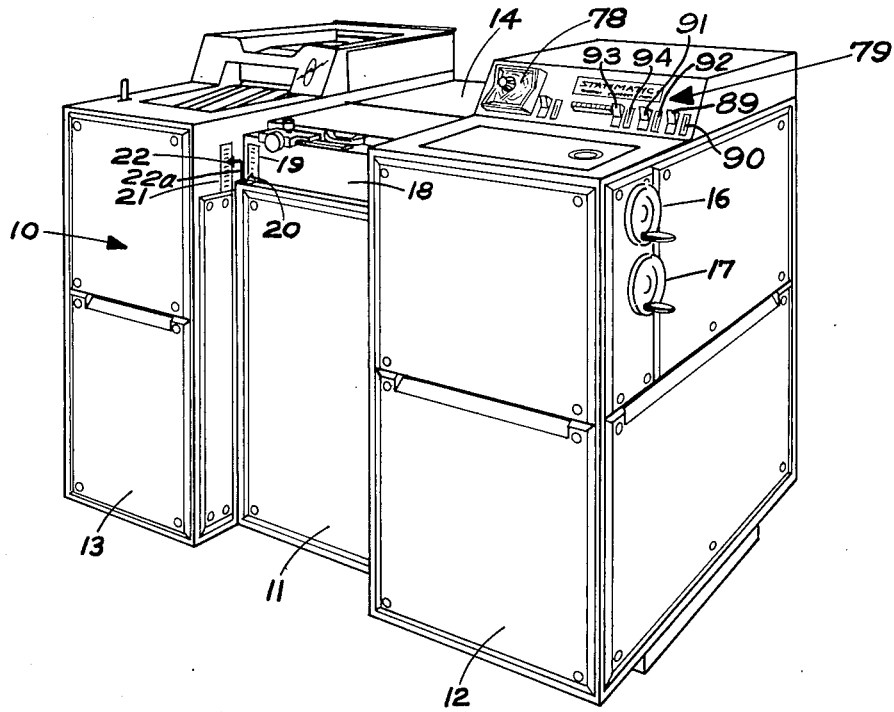
Figure 4:
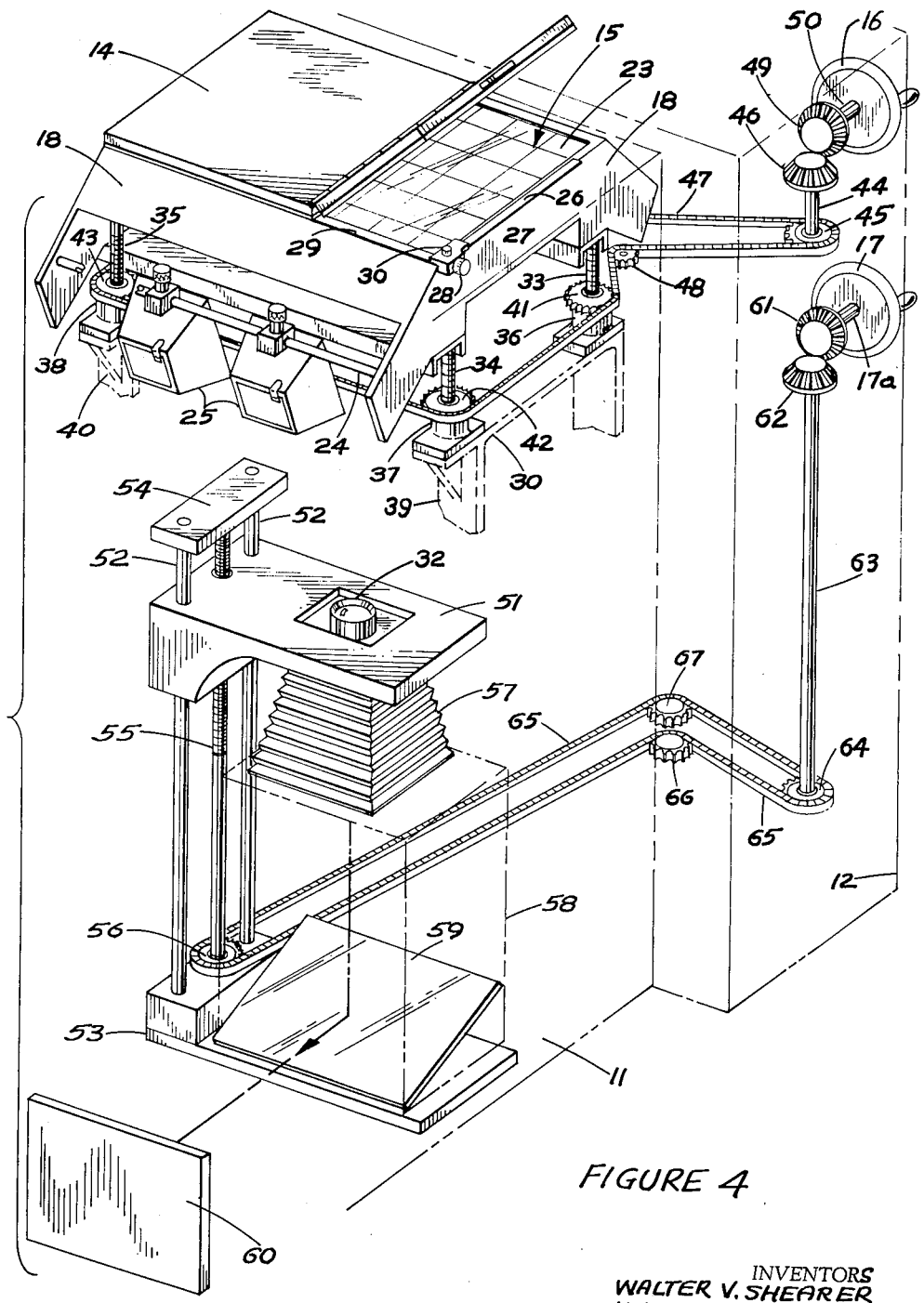
Figure 5:
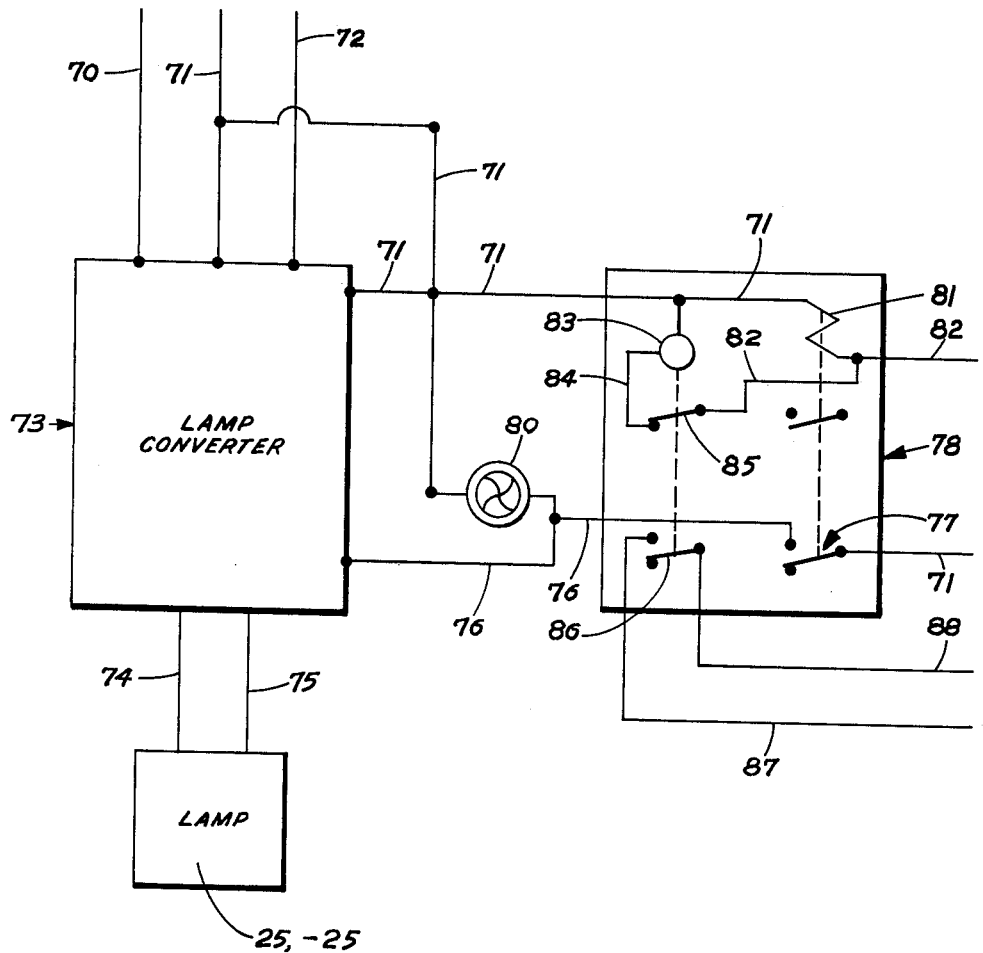

FIGURE 1 is a perspective view of a photoelectrostatic reprographer which includes as an essential component, the apparatus in accordance with this invention, FIGURE 2 is a fragmentary view of an embodiment of the indicators for the relative positions of the copyboard and the lens of this apparatus, FIGURE 3 is a fragmentary, perspective view of an embodiment of the copyboard and copy-positioning guide of this apparatus, FIGURE 4 is an exploded, perspective view of a representative embodiment of this apparatus, FIGURE 5 is an electrical wiring diagram of the electrical circuits for the electric lamps and the shutter of this optical apparatus.

Referring specifically to FIGURE 1, it will be seen that the outside of the reprographer is a cabinet, indicated by the numeral 10, which is generally rectangular in shape and made up of three sections; a center section 11, a righthand section 12 and a lefthand section 13. The optical apparatus in accordance with this invention is located within the center section of this apparatus. The copyboard of this apparatus is beneath the cover 14 at a convenient working level for an operator standing in front of it.

The righthand section 12 of this cabinet carries a control panel A, indicated by the numeral 79. This control panel carries a master electric power switch 89 by which the electrical supply to the apparatus can be turned on and off. The pilot light 90 shows whether this switch is on or off. It carries a starting switch 91 by which the apparatus can be placed in operation and complete the sequence of steps required to complete one photoelectrostatic copy, after which the apparatus stops operating. The pilot light 92 shows whether the switch 91 is on or off. The switch 93 places the apparatus in automatic operation which will continue to produce copies until this switch is pressed a second time. After the switch 93 is pressed a second time, the apparatus continues the sequence of steps required to complete a copy in process at that instant. The pilot light 94 indicates whether the switch 93 is on or off.

The control panel 79 carries, in additon, an exposure timer 78 by which the operator can fix the period of time during which the copy sheet bearing an electrostatic charge is exposed to a light image. This control panel 79 provides in one convenient location each of the controls required for either the manual or the automatic operation of the apparatus.

The handwheel 16 on the righthand end of the cabinet adjusts the position of the copyboard of this apparatus and its associated lighting system along a vertical line of travel. The position of the copyboard relative to the remainder of the optical system of the apparatus is shown by an indicator which consists of a scale 19 attached to the frame 18 of the copyboard and a pointer 20 attached to the upper edge of the front panel of section 11 of cabinet 10 as best shown by FIGURE 2. As the copyboard is moved upwardly and downwardly by the operation of the handwheel 16, the scale 19 moves with it and the pointer 20 shows the exact position of the copyboard.

The handwheel 17 adjusts the position of the lens of the optical system along a vertical line of travel. The scale 21 is affixed to the edge of section 13 of cabinet 10. The pointer 22 is at the end of a rod 22a which is attached at its other end to the plate which carries the lens of the optical system which is fully described below with reference to FIGURE 4. As this lens plate and the lens which it carries are adjusted upwardly and downwardly by the operation of the handwheel 17, the pointer 22 is correspondingly moved and shows the exact position of the lens by its position relative to the scale 21.

This optical apparatus can be adjusted to give a clearly focused light image in its optical image plane which is the same in size as the original copy, reduced in size or enlarged in size, as may be desired, by the operation of the hand wheels 16 and 17.

The details of the copyboard and the optical system carried by the center section 11 of cabinet 10 are shown by FIGURES 3 and 4. Referring specifically to those figures, it will be seen that the copyboard 15 consists of a transparent sheet 23 which provides a horizontal surface on which an original copy to be reproduced is positioned facing downwardly and a hinged cover 14, both of which are carried by a rigid frame 18. The frame 18 also carries light bars 24, 24 along each side, one of which can be seen in FIGURE 4. These light bars carry electric lamps 25, 25 adjustably positioned thereon. Each of these light bars is detachable from the frame 18 as a unit to permit its removal from the apparatus for the replacement of bulbs, adjustment, cleaning, etc. As shown by FIGURE 4, the lamps 25, 25 are at lower level than the sheet 23 and are each spaced away from the adjacent edge of the sheet 23, so that they are not directly beneath it.

The electric lamps 25, 25 are disposed in positions with respect to the transparent surface 23 of the copyboard 15 to nonuniformly illuminate the transparent surface with an intensity of illumination which increases outwardly from a point directly above the axis of the lens system to the periphery of that surface in a proportion which gives uniform illumination reflected from a white surface on the transparent surface 23 at the vertical optical image plane of the apparatus.

Referring specifically to FIGURE 3, it will be seen that the upper edge of frame 18 of the copyboard carries a fixed scale 26 forming a part of a copy position indicator. The slide 27 can be moved back-and-forth along the scale 26 and locked in any desired position by means of the thumb screw 28. The slide 27 carries the end of a rule 29 which is affixed thereto by the thumb screw 30. The rule 29 rests on the surface of the sheet 23 of the copyboard and is free to slide across its surface as the slide 27 is moved along the scale 26. As will be seen from FIGURE 3, an original 31 to be copied can be centered over the lens and shutter 32 of the optical system by adjusting the position of the slide 27 on the fixed scale 26 and then, with the edge of the original 31 against the side of the rule 29, adjusting its position relative to the scale on that rule. After the original is properly positioned, the cover 14 of the copyboard is closed to retain it in position.

Referring specifically to FIGURE 4, it will be seen that the frame 18 is carried by four threaded shafts, three of which, 33, 34 and 35, are visible in the drawing. The lower ends of these shafts are mounted in bearings 36, 37 and 38. The bearings 36 and 37 are, in turn, mounted on the frame 39, while the bearing 38 and a similar bearing, not shown by the drawing, are mounted on frame 40. The frames 39 and 40, shown broken away in the drawing, are supported by a lower frame of the apparatus. The four threaded shafts supporting the frame 18, including 33, 34 and 65 shown by the drawing, are threaded into internally threaded collars attached to the frame 18, so that when the shafts are rotated, the frame 18 is raised or lowered depending upon the direction of rotation of the shafts. Each of these four shafts carry sprockets of which, 41, 42 and 43 on shafts 33, 34 and 35, respectively, are shown by the drawing.

The vertical shaft 44 is carried by a journal attached to the frame and carries a sprocket 45 on its lower end and a beveled gear 46 on its upper end. The chain 47 passes around the sprockets 45, 41, 42 and 43 as well as around the sprocket on the fourth of the shafts which carry the frame 18. The idler sprocket 48 on the outer side of the chain 47 keeps the chain meshed with the sprocket 41. The beveled gear 46 on the upper end of the vertical shaft 44 is meshed with a second beveled gear 49 on the inner end of the horizontal shaft 50 which is carried by a journal attached to the frame of the apparatus and extends through the right side wall of the cabinet 10 of the apparatus. The outer end of the horizontal shaft 50 carries the handwheel 16 to which reference has already been made. The rotation of the handwheel 16 rotates the four shafts, including 33, 34 and 35, and raises or lowers the frame of the copyboard, as may be desired.

The four threaded shafts, including shafts 33, 34 and 35 shown by FIGURE 4, provide a convenient and effective means for leveling the transparent sheet 23 of the copyboard 15. As can readily be appreciated, the plane of the upper surface of the transparent sheet 23 of the copyboard must be exactly normal to the axis of the lens system 32 of this optical system. The practical way to obtain this normal relationship is to align the axis of the lens system 32 perpendicularly and to position the surface of the transparent sheet 23 in a horizontal plane by the adjustment of the position of its frame 18.

A precise adjustment of the frame 18 to position the transparent sheet 23 in a horizontal plane can be readily accomplished in this apparatus by detaching the sprockets 41, 42 and 43 from the threaded shafts 33, 34 and 35, shown by FIGURE 4, and detaching the fourth sprocket from the fourth threaded shaft supporting the frame 18, not shown by FIGURE 4, and then rotating the threaded shafts to exactly level the surface of the transparent sheet 23 into a horizontal plane. The sprockets 41, 42 and 43 are then firmly affixed to the threaded shafts 33, 34 and 35, respectively, and the fourth sprocket similarly affixed to the fourth of the threaded shafts. This, in effect, adjusts the exact, relative positions of the threads on the shafts 33, 34 and those of the fourth, not shown by FIGURE 4, relative to the teeth of the sprockets they carry and to the drive chain 47.

Alternatively, such an adjustment can be achieved by detaching the drive chain 47 from engagement with the sprockets 41, 42 and 43 and the fourth corresponding sprocket, rotating these sprockets relative to each other to place the surface of the transparent sheet 23 in a horizontal plane and then replacing the drive chain 47 with its links engaging the teeth of the sprockets in their adjusted position.

Still referring to FIGURE 4, the optical system of the apparatus consists of a lens system 32 which includes a lens, a shutter, an adjustable diaphragm, a solenoid for the operation of the shutter and electrical terminals for the connection of the solenoid to the electrical circuits of the apparatus carried by the plate 51. The plate 51 is slideably mounted on the vertical rods 52, 52. The vertical rods are carried by the base plate 53 of the unit and are attached at their upper ends to the plate 54. The plate 51 is threaded onto the shaft 55, the upper section of which is threaded and which is held at its lower end by a bearing carried by the base plate 53 and at its upper end by a bearing carried by the plate 54. The shaft 55 carries the sprocket 56.

The plates 53 and 54 are rigidly attached to a supporting frame, not shown by FIGURE 4, to provide firm support for the rods 52, 52 and the shaft 55. The supporting frame is designed to be free of vibration resulting from the movement of the mechanical parts of related apparatus. The rods 52, 52 and the shaft 55 are exactly aligned with their axes normal to a horizontal plane. The lens system 32 is affixed to plate 51 with its optical axis also normal to a horizontal plane. These alignments assure that the optical axis of the lens system 32 remains normal to the surface of the transparent sheet 23 at any level to which it may be adjusted by the operation of the handwheel 17.

The optical path below the lens system 32 is protected from scattered light by the flexible bellows 57 and by the box shroud 58, indicated by the broken lines. The box shroud is carried by the base plate 53 of the unit and has an opening in one side. A mirror 59 is mounted in the box shroud at an angle of forty-five degrees to reflect an image from the lens system 32 through the opening in the side of the box shroud to the optical image plane of the apparatus in which the surface of the vacuum platen 60 or other device positions a light-sensitive sheet in the optical image plane of the apparatus. The mirror 59 in this specific embodiment of the apparatus is positioned to reflect the optical image to the left of the apparatus along a path parallel to the length of its cabinet. The optical image plane is vertical across the apparatus and at a position approximating the division between the center section 11 and the lefthand section 13 of the cabinet 10 of the apparatus.

The handwheel 17 on the outside of the righthand section 12 of the cabinet of the apparatus is attached to the end of a shaft 17a extending through the wall of the cabinet and is carried by a journal, not shown by the drawing, just within the wall of the cabinet. It has a beveled gear 61 on its inner end which meshes with the beveled gear 62 affixed to the upper end of the vertical shaft 63. The lower end of the shaft 63 carries a sprocket 64. The vertical shaft 63 is carried by journals attached to the frame of the apparatus which are not shown by the drawings. The sprocket 64 is connected by the chain 65 to the sprocket 56 and is guided by the idler sprockets 66 and 67. The rotation of the handwheel 17 causes the rotation of the shaft 55 which, in turn, causes the lens plate 51 to be raised or lowered depending upon the direction of rotation of the handwheel, thereby adjusting the position of the lens system 32 along a vertical path.

FIGURE 5 illustrates the electrical circuits which operate the electric lamps and the shutter of this apparatus. Referring specifically to that figure, the electrical power supply of this apparatus is supplied with a suitable source of 220-volt A.C. current through the electric lines 70, 71 and 72. The main power switch 89 of the apparatus, illustrated by FIGURE 1, provides a means for turning the power supply on and off by closing and opening the circuits to lines 70 and 72. The lines 70 and 72 are connected on the apparatus side of the switch through the pilot light 90, also shown by FIGURE 1, which glows when the switch 89 is closed and the apparatus is being supplied with electric current.

The electric lines 70, 71 and 72 are connected to the lamp converter 73 to furnish it with an input 220-volt A.C. current. This converter 73 is electrically connected to the lamps 25, 25 of the optical system of the apparatus, illustrated by FIGURE 4. The voltage of the current supplied by the converter 73 is at two distinctly different levels which are determined by the particular phase of operation of the apparatus as is fully explained further on. The lamp converter 73 is also connected by lines 71 and 76 to the switch 77 of the timer 78, which is illustrated by FIGURE 1.

The lamp converter 73 supplies a relatively low voltage electric current to the lamps 25, 25 of this optical apparatus at all times that the main power switch 89 of the apparatus is closed. The purpose of this current is to keep the filaments of the lamps 25, 25 relatively hot, so that when they are supplied with the higher voltage required to bring them to the desired level of illumination to expose a light-sensitive sheet to an optical image, they will reach that level of illumination in an extremely brief interval of time.

The operation of the solenoid of the shutter 80 of the lens system 32 by the action of the electric timer 78 also activates the lamp converter 73 through the lines 71 and 76 to cause it to supply the higher voltage to the lamps 25, 25 which are preset to give the desired level of illumination for the exposure of a light-sensitive sheet. The closing of the shutter 80 by the action of the electric timer 78 causes the lamp converter 73 to reduce the voltage of the current supplied to the lamps 25, 25 from that supplied for the exposure to the lower voltage supplied to keep the filaments of the lamps hot and merely glowing.

One terminal of the solenoid of the shutter 80 of the shutter and lens system 32 is connected to the electric line 71, while the other terminal of this solenoid is connected by line 76 to the lamp converter 73. This terminal of the shutter solenoid is also connected by the line 76 to the switch 77 of the electric timer 78. The other terminal of the switch 77 is connected to the line 71 which is, in turn, connected to an automatic, electrical control circuit which controls the sequence of operations of mechanical components of automatic reproduction equipment and provides an electric pulse to start the operation of the timer 78, the opening of the shutter 80 and the increase of the voltage supplied to the lamps 25, 25 as will be more fully described hereinafter.

The timer switch 77 is mechanically tied to the clutch 81 of the timer 78. One terminal of the clutch 81 is connected by line 82 to the automatic, electrical control circuit associated with the apparatus, while the other terminal of the clutch 81 is connected by line 71 to one terminal of the motor 83 of the timer and to one terminal of the master power supply. The other terminal of the timer motor 83 is connected by line 84 to the switch 85 of the timer. The other terminal of the switch 85 is connected by line 82 to the automatic, electrical control circuit of the apparatus.

The timer switch 85 is mechanically linked to the timer motor 83 and to the timer switch 86. The timer switch 85 is in its closed position when the switch 86 is opened and vice versa. One of the electrical terminals of the switch 86 is connected by the line 88 to the automatic, electrical control circuit of the apparatus, while the other terminal is connected by line 87 to one terminal of the switch 89.

The first step in the operation of the apparatus in accordance with this invention is to turn on the main power switch 89. The closing of this switch supplies 220-volt A.C. current to the lamp converter unit 73 to cause it to supply low voltage current to the electric lamps 25, 25 to cause them to glow at a low level of illumination. The closing of the switch 89 also supplies 110-volt A.C. current to the automatic, electrical control system of the apparatus. The closing of the starting switch 91 starts the operation of the automatic, electrical control system and causes it to take the apparatus with which this apparatus is associated and the apparatus itself through one complete cycle of operations. The closing of the switch 93 causes the apparatus to operate continuously starting a new cycle as soon as one cycle is completed.

This automatic, electrical control system is not a part of the present invention. However, it may be noted that it includes a combination of stepping switches and limit switches which control the sequence of operations.

We claim:
1. In apparatus for the reproduction of original copy, the combination of:
    a means for retaining the original to be copied in a horizontal plane;
    a lens system having its optical axis positioned vertically which includes a lens, a diaphragm, a shutter and a solenoid for opening and closing the said shutter;

a mirror located below the said lens system with its reflecting surface at an angle of forty-five degrees to the optical axis of the lens system in a position to reflect an optical image transmitted by the said lens to a vertical optical image plane;

a light source adjacent the horizontal plane in which the said copy-retaining means holds an original copy, the said light source being located to produce an optical image of the original copy which is transmitted by the lens to the mirror which reflects it to the vertical optical image plane;

the said lens being located between the horizontal plane of the original copy and the mirror in a position with respect to its optical characteristics to permit it to transmit a clear optical image of said original copy in the said horizontal plane to the said mirror;

intensity control means connected to said light source which keeps it operating constantly at least at a low level and, upon activation, increases the intensity of said light source to a desired, preset, higher level of illumination;

an electric timer which is electrically connected to the shutter solenoid, to the intensity control means connected to the light source, and to an electrical control system which, upon receiving an electric pulse from the said control system, simultaneously causes the solenoid to open the shutter and activates the intensity control means connected to the light source to increase the intensity of said light source to the desired, preset, higher level of illumination and after a preset period of time simultaneously causes the solenoid to close the shutter and causes the intensity control means connected to the light source to reduce the intensity of said light source to its original low level; and an electrical control system for the activation of the said timer by an electric pulse.

2. In apparatus for the reproduction of original copy, the combination of:

a means for retaining the original to be copied in a horizontal plane;

a lens system having its optical axis positioned vertically which includes a lens, a diaphragm, a shutter and a solenoid for opening and closing said shutter;

a mirror located below the said lens system with its reflecting surface at an angle of forty-five degrees to the optical axis of the lens system in a position to reflect an optical image transmitted by the said lens to a vertical optical image plane;

a light source adjacent the horizontal plane in which the said copy-retaining means holds an original copy in position for the production of an optical image thereof for transmission by the said lens system;

the said light source having the characteristic of illuminating the horizontal plane of the original copy with a nonuniform intensity which increases outwardly from a point directly above the optical axis of the said lens to the periphery of the area to be occupied by the original copy which, upon transmission by the said lens and the said mirror, gives uniform illumination over the entire area of the vertical optical image plane;

the said lens being located between the horizontal plane of the original copy and the mirror in a position with respect to its optical characteristics to permit it to transmit a clear optical image of said original copy in the said horizontal plane to the said mirror;

intensity control means connected to said light source which keeps it operating constantly at least at a low level and, upon activation, increases the intensity of said light source to a desired, preset, higher level of illumination;

an electric timer which is electrically connected to the shutter solenoid, to the intensity control means connected to the light source, and to an electrical control system which, upon receiving an electric pulse from the said control system, simultaneously causes the solenoid to open the shutter and activates the intensity control means connected to the light source to increase the intensity of said light source to the desired, preset, higher level of illumination and after a preset period of time simultaneously causes the solenoid to close the shutter and causes the intensity control means connected to the light source to reduce the intensity of said light source to its original low level; and an electrical control system for the activation of the said timer by an electric pulse.

3. In apparatus for the reproduction of original copy, the combination of:

a means for retaining the original to be copied in a horizontal plane;

a lens system having its optical axis positioned vertically which includes a lens, a diaphragm, a shutter and a solenoid for opening and closing the said shutter;

a mirror located below the said lens system with its reflecting surface at an angle of forty-five degrees to the optical axis of the lens system in a position to reflect an optical image transmitted by the said lens to a vertical optical image plane;

a plurality of electric lamps which illuminate the horizontal plane of the original copy with a nonuniform intensity which increases outwardly from a point directly above the optical axis of the said lens to the periphery of the area to be occupied by the original copy which, upon reflection from a white surface in the said horizontal plane and transmission by the said lens and the said mirror to the vertical optical image plane, gives uniform illumination over the entire area of the vertical optical image plane;

the said lens being located between the horizontal plane of the original copy and the mirror in a position with respect to its optical characteristics to permit it to transmit a clear optical image of said original copy in its said horizontal plane to the said mirror;

intensity control means connected to said plurality of electric lamps which keeps them operating constantly at least at a low level and, upon activation, increases the intensity of said plurality of electric lamps to a desired, preset, higher level of illumination;

an electric timer which is electrically connected to the shutter solenoid, to the intensity control means connected to the said plurality of electric lamps, and to an electrical control system which, upon receiving an electric pulse from the said control system, simultaneously causes the solenoid to open the shutter and atcivates the intensity control means connected to the plurality of electric lamps to increase the intensity of said plurality of electric lamps to the desired, preset, higher level of illumination and after a preset period of time simultaneously causes the solenoid to close the shutter and causes the intensity control means connected to the plurality of electric lamps to reduce the intensity of said plurality of electric lamps to their original low level; and an electric control system for the activation of the said timer by an electric pulse.

4. In apparatus for the reproduction of original copy, the combination of:

a means for retaining the orignal to be copied in a horizontal plane;

a lens system having its optical axis positioned vertically which includes a lens, a diaphragm, a shutter and a solenoid for opening and closing the said shutter;

a mirror located below the said lens system with its reflecting surface at an angle of forty-five degrees to the optical axis of the lens system in a position to reflect an optical image transmitted by the said lens to a vertical optical image plane;

a light source which nonuniformly illuminates the said horizontal plane from above with an intensity of illumination which increases from a point directly above the optical axis of the said lens to the periphery of the area to be occupied by the original copy which, upon transmission through a transparent sheet, through the lens and reflection by the said mirror, gives a uniform illumination over the entire area of the vertical optical image plane;

the said lens being located between the said horizontal plane and the said mirror in a position with regard to its optical characteristics to permit it to transmit a clear optical image of an original copy held in the said horizontal plane to the said vertical optical image plane;

intensity control means connected to said light source which keeps it operating constantly at least at a low level and, upon activation, increases the intensity of said light source to a desired, preset, higher level of illumination;

an electric timer which is electrically connected to the shutter solenoid, to the intensity control means connected to the light source, and to an electrical control system which, upon receiving an electric pulse from the said control system, simultaneously causes the solenoid to open the shutter and activates the intensity control to increase the intensity of said light source to the desired, preset, higher level of illumination and after a preset period of time simultaneously causes the solenoid to close the shutter and causes the intensity control means connected to the light source to reduce the intensity of said light source to its original low level; and an electrical control system for the activation of the said timer by an electric pulse.

5. In apparatus for the reproduction of original copy, the combination of:

a horizontal, transparent, copy-receiving surface;

an optical system comprising a mirror beneath the said copy-receiving surface which is positioned at an angle of forty-five degrees to the horizontal plane of the copy-receiving surface;

a lens system including a lens, a diaphragm, a shutter and a remote-control means for opening and closing the said shutter, the said lens, diaphragm and shutter being positioned between the mirror and the copy-receiving surface and the said lens having optical characteristics and being in a position with respect to the copy-receiving surface and to the mirror to transmit an optical image of the entire copy-receiving surface to the mirror which, in turn, reflects the image to a vertical image plane;

a plurality of light sources disposed at a level below the plane of the copy-receiving surface which illuminate the entire area of the copy-receiving surface from beneath without obstructing the light path of the optical system from the copy-receiving surface to the vertical plane;

intensity control means connected to said plurality of light sources which keeps them operating constantly at least at a low level and, upon activation, increases the intensity of said plurality of light sources to a desired, preset, higher level of illumination;

an electric timer which is electrically connected to the shutter-remote control means, to the intensity control means connected to the said plurality of light sources, and to an electrical control system which, upon receiving an electric pulse from the said control system, simultaneously causes the remote-control means to open the shutter and activates the intensity control means connected to the plurality of light sources to increase the intensity of said plurality of light sources to the desired, preset, higher level of illumination and after a preset period of time simultaneously causes the remote-control means to close the shutter and causes the intensity control means connected to the plurality of light sources to reduce the intensity of said plurality of light sources to their original low level; and an electrical control system for the activation of the said timer by an electric pulse.

6. In apparatus for the reproduction of original copy, the combination of:

a horizontal, transparent, copy-receiving surface;

an optical system comprising a mirror beneath the said copy-receiving surface which is positioned at an angle of forty-five degrees to the horizontal plane of the copy-receiving surface;

a lens system including a lens, a diaphragm, a shutter and a solenoid for opening and closing the said shutter, the said lens, diaphragm and shutter being positioned between the said copy-receiving surface and the said mirror and the said lens having optical characteristics and being in a position with respect to the said copy-receiving surface and to the said mirror to transmit an optical image of the entire copy-receiving surface to the said mirror which, in turn, reflects the said image to a vertical image plane;

a plurality of electric lamps disposed at a level below the plane of the said copy-receiving surface which illuminate the entire area of the copy-receiving surface from beneath without obstructing the light path of the said optical system with an intensity of illumination which increases from a point directly above the optical axis of the said lens to the periphery of the said copy-receiving surface and which, upon reflection from a white surface on the said copy-receiving surface and transmission to the vertical image plane, uniformly illuminate the entire image plane;

intensity control means connected to said plurality of electric lamps which keeps them operating constantly at least at a low level and, upon activation, increases the intensity of said plurality of electric lamps to a desired, preset, higher level of illumination;

an electric timer which is electrically connected to the shutter solenoid, to the intensity control means connected to the said plurality of electric lamps, and to an electrical control system which, upon receiving an electric pulse from the said control system, simultaneously causes the solenoid to open the shutter and activates the intensity control means connected to the plurality of electric lamps to increase the intensity of said plurality of electric lamps to the desired, preset, higher level of illumination and after a preset period of time simultaneously causes the solenoid to close the shutter and causes the intensity control means connected to the plurality of electric lamps to reduce the intensity of said plurality of electric lamps to their original low level; and an electrical control system for the activation of the said timer by an electric pulse.

7. In apparatus for the reproduction of original copy, the combination of:

a horizontal, transparent, copy-receiving surface;

an optical system comprising a mirror beneath the said copy-receiving surface which is positioned at an angle of forty-five degrees to the horizontal plane of the copy-receiving surface;

a lens system including a lens, a diaphragm, a shutter and a remote-control means for opening and closing the said shutter, the said lens, diaphragm and shutter being positioned between the said mirror and the said copy-receiving surface and having optical characteristics and being in a position with respect to the said copy-receiving surface and to the said mirror to transmit an optical image of the entire copy-receiving surface to the said mirror which, in turn, reflects the said image to a vertical image plane;

means for adjusting the position of the copy-receiving surface along a vertical axis and means for adjusting the position of the said lens along a vertical axis by which the size of the image transmitted to the vertical image plane can be changed;

a plurality of light sources disposed at a level below the plane of the copy-receiving surface which illuminate the entire area of the said copy-receiving surface from beneath without obstructing the light path of the said optical system from the said copy-receiving surface to the said vertical plane;

the said light sources being attached to the said copy-receiving surface so that their positions with respect to that surface do not change when the position of that surface is adjusted along a vertical axis;

intensity control means connected to said plurality of light sources which keeps them operating constantly at least at a low level and, upon activation, increases the intensity of said plurality of light sources to a desired, preset, higher level of illumination;

an electric timer which is electrically connected to the shutter remote-control means, to the intensity control means connected to the said plurality of light sources, and to an electrical control system which, upon receiving an electric pulse from the said control system, simultaneously causes the remote-control means to open the shutter and activates the intensity control means connected to the plurality of light sources to increase the intensity of said plurality of light sources to the desired, preset, higher level of illumination and after a preset period of time simultaneously causes the remote-control means to close the shutter and causes the intensity control means connected to the plurality of light sources to reduce the intensity of said plurality of light sources to their original low level; and an electrical control system for the activation of the said timer by an electric pulse.

8. In apparatus for the reproduction of original copy, the combination of:

a horizontal, transparent, copy-receiving surface which forms an upper surface of a cabinet;

an optical system within the said cabinet comprising a mirror beneath the said copy-receiving surface which is positioned at an angle of forty-five degrees to the horizontal plane of the copy-receiving surface;

a lens system including a lens, a diaphragm, a shutter and a remote-control means for opening and closing the said shutter, the said lens, diaphragm and shutter being positioned between the said mirror and the said copy-receiving surface and the said lens having optical characteristics and being in a position with respect to the copy-receiving surface and to the mirror to transmit an optical image of the entire copy-receiving surface to the said mirror which, in turn, reflects the image to a vertical image plane;

means operated by a convenient handwheel on the outside of the cabinet for adjusting the position of the copy-receiving surface along a vertical axis;

a readily visible indicator outside the cabinet which records the position of the copy-receiving surface;

means operated by a convenient handwheel on the outside of the cabinet for adjusting the position of the said lens along a vertical axis and a readily visible indicator outside the cabinet which records the position of the lens;

the said handwheels and indicator means permitting the convenient and expeditious adjustment of the size of the image transmitted to the vertical image plane of the apparatus;

a plurality of light sources disposed at a level below the plane of the copy-receiving surface which illuminate the entire area of the copy-receiving surface from beneath without obstructing the light path of the optical system from the copy-receiving surface to the vertical plane;

the light sources being attached to the copy-receiving surface so that their positions with respect to that surface do not change when the position of that surface is adjusted along a vertical axis;

intensity control means connected to said plurality of light sources which keeps them operating constantly at least at a low level and, upon activation, increases the intensity of said plurality of light sources to a desired, preset, higher level of illumination;

an electric timer which is electrically connected to the shutter remote-control means to the intensity control means connected to the said plurality of light sources, and to an electrical control system which, upon receiving an electric pulse from the said control system, simultaneously causes the remote-control means to open the shutter and activates the intensity control means connected to the said plurality of light sources to increase the intensity of said plurality of light sources to the desired, preset, higher level of illumination and after a preset period of time simultaneously causes the remote-control means to close the shutter and causes the intensity control means connected to the said plurality of light sources to reduce the intensity of said plurality of light sources to their original low level; and an electric control system for the activation of the said timer by an electric pulse.

9. In apparatus for the reproduction of original copy, the combination of:

a horizontal, transparent, copy-receiving surface;

an optical system comprising a mirror beneath the said copy-receiving surface which is positioned at an angle of forty-five degrees to the horizontal plane of the copy-receiving surface;

a lens system including a lens, a diaphragm, a shutter and a solenoid for opening and closing the said shutter, the said lens, diaphragm and shutter being positioned between the said copy-receiving surface and the said mirror, the said lens having optical characteristics and being in a position with respect to the said copy-receiving surface and to the said mirror to transmit an optical image of the entire copy-receiving surface to the said mirror which, in turn, reflects the said image to a vertical image plane;

a plurality of electric lamps disposed at a level below the plane of the said copy-receiving surface which illuminate the entire area of the copy-receiving surface from beneath without obstructing the light path of the said optical system with an intensity of illumination which increases from a point directly above the optical axis of the said lens to the periphery of the said copy-receiving surface and which, upon reflection from a white surface on the said copy-receiving surface and transmission to the vertical image plane, uniformly illuminate the entire image plane;

a variable voltage power supply electrically connected to the said lamps which supplies an electric current of relatively low voltage to the lamps to keep them glowing and, upon activation, increases the voltage of the current supplied to the lamps to a preset, higher level which brings the lamps to a desired level of illumination;

an electric timer which is electrically connected to the shutter solenoid, to the electric power supply of the lamps and to an electrical control system which, upon receiving an electric pulse from the said control system, simultaneously causes the solenoid to open the shutter and to activate the power supply to the lamps to increase the voltage of the current supplied to the lamps from a relatively low level to a preset, higher level which brings the lamps to the desired level of illumination and after a preset period of time simultaneously causes the solenoid to close the shutter and causes the said power supply to reduce the voltage supplied to the lamps to its original low level; and an electrical control system for the activation of the said timer by an electric pulse.

10. In apparatus adapted for the reproduction of images by a process in which a photoelectrostatic sheet bearing an electrostatic charge is exposed to an optical image, the combination which comprises:
- a plurality of electric lamps adapted to illuminate an original copy to be reproduced;
- a lens system for the transmission of an optical image of the original copy to an optical image plane which includes a shutter and a solenoid for opening and closing the said shutter;
- a variable voltage power supply electrically connected to the said lamps which supplies an electric current of relatively low voltage to the lamps to keep them glowing and, upon activation, increases the voltage of the current supplied to the lamps to a preset, higher level which brings the lamps to a desired level of illumination;
- an electric timer which is electrically connected to the shutter solenoid, to the electric power supply of the lamps and to an electrical control system which, upon receiving an electric pulse from the said control system, simultaneously causes the solenoid to open the shutter and to activate the power supply to the lamps to increase the voltage of the current supplied to the lamps from a relative low level to a preset, higher level which brings the lamps to the desired level of illumination and after a preset period of time simultaneously causes the solenoid to close the shutter and causes the said power supply to reduce the voltage supplied to the lamps to its original low level; and
- an electrical control system for the activation of the said timer by an electric pulse.

References Cited by the Examiner
UNITED STATES PATENTS

| | | | |
|---|---|---|---|
| 2,319,882 | 5/1943 | Reagan et al. | 88—24 |
| 2,372,910 | 4/1945 | Pratt | 88—24 |
| 2,940,358 | 6/1960 | Rosenthal | 88—24 |
| 3,076,378 | 2/1963 | Biedermann et al. | 88—24 |

NORTON ANSHER, *Primary Examiner.*

RICHARD A. WINTERCORN, *Assistant Examiner.*